Dec. 29, 1942.  H. A. KIRK  2,306,481
VARIABLE FLUID BRAKING MEANS
Filed Oct. 24, 1941   3 Sheets-Sheet 1

Inventor
Howard A. Kirk,
By
G. C. Kennedy
Attorney

Dec. 29, 1942.                H. A. KIRK                2,306,481
                      VARIABLE FLUID BRAKING MEANS
                       Filed Oct. 24, 1941        3 Sheets—Sheet 2
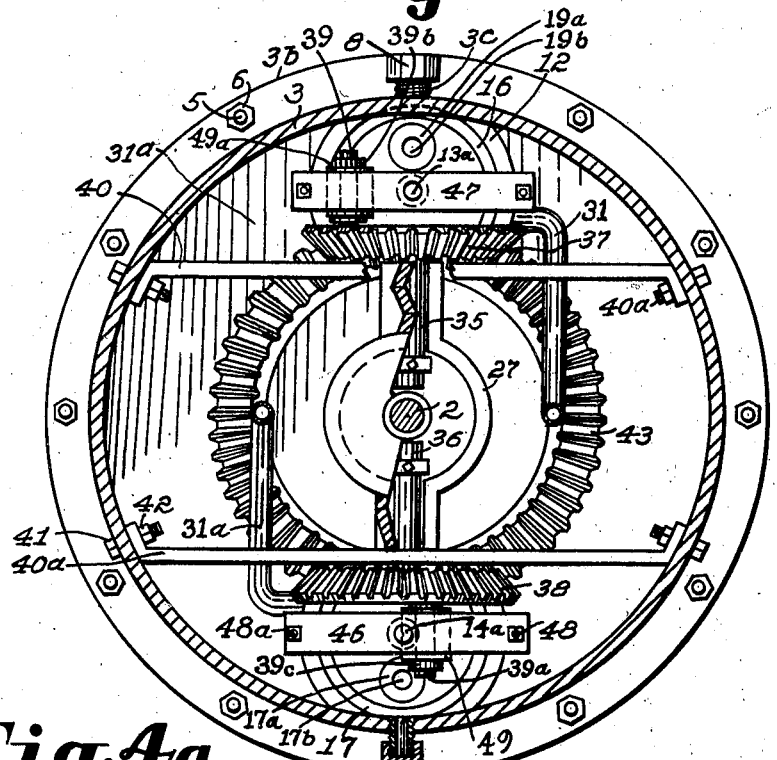
Inventor
Howard A. Kirk,
By G.C. Kennedy
Attorney Dec. 29, 1942.                H. A. KIRK                    2,306,481
                      VARIABLE FLUID BRAKING MEANS
                      Filed Oct. 24, 1941            3 Sheets-Sheet 3

Inventor
Howard A. Kirk,
By
G. C. Kennedy
Attorney

Patented Dec. 29, 1942

2,306,481

UNITED STATES PATENT OFFICE 2,306,481

VARIABLE FLUID BRAKING MEANS

Howard A. Kirk, Otter Creek Township, Linn County, Iowa

Application October 24, 1941, Serial No. 416,348

1 Claim. (Cl. 74—294)

My invention relates to improvements in variable fluid braking means, and an object of my improvements is to provide entrained mechanism within a closed container and adjustably associated with manually governed external devices without, the mechanism being submerged in an oil bath, whereby said mechanism is actuated for variable braking effects in coaction with the oil contents.

Another object is to include in the internal mechanism valvular means controllable manually from without the container, to vary the delivery of oil from the valvular means to pairs of pistons movable alternately within the container to produce such delivery action as desired in effecting a braking effect by means of intermediate elements operated by a driving device traversing the container.

Other objects of my improvements will be described hereinafter, according to the drawings and as to their respective operations in entrainment or operative succession.

Changes may be effected in the construction and arrangement of the parts of my invention without departing from the real spirit and purposes thereof, as shown and described herein.

Figure 1:
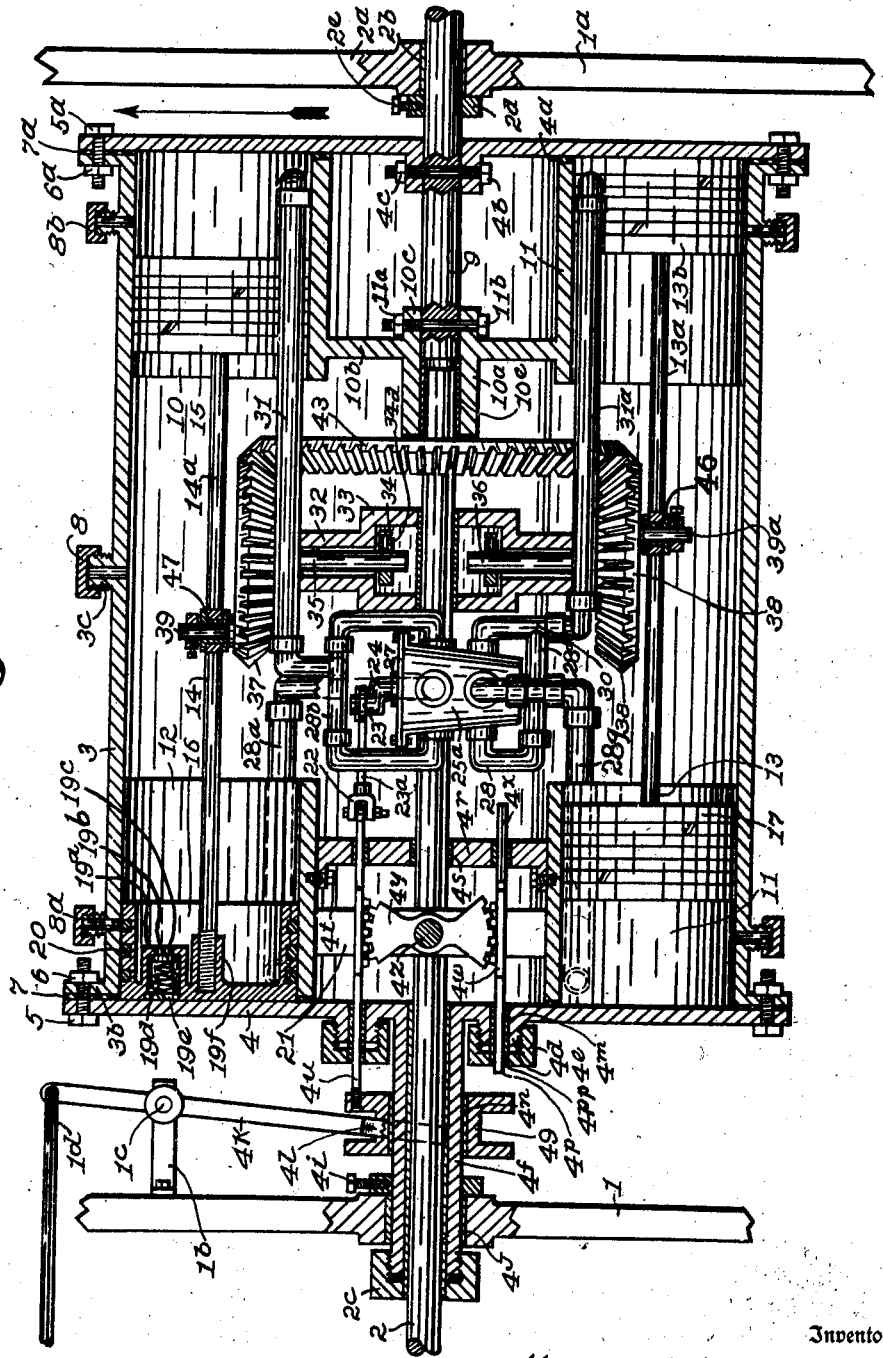
Figure 5:
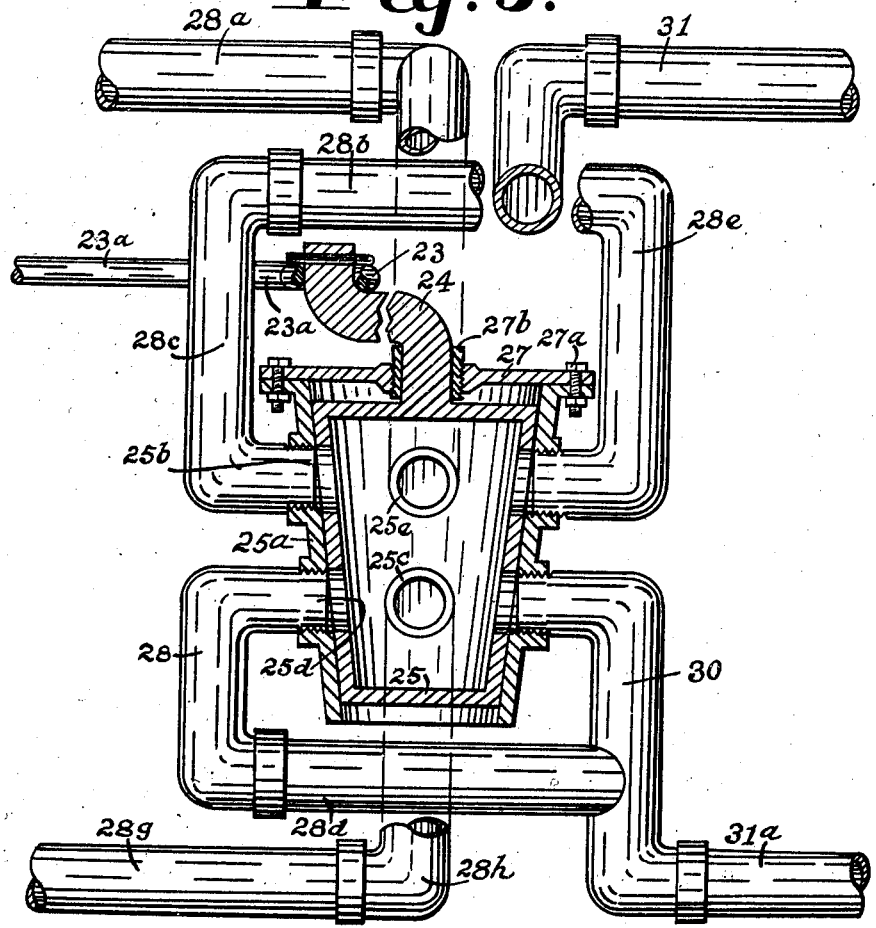
Figure 6:
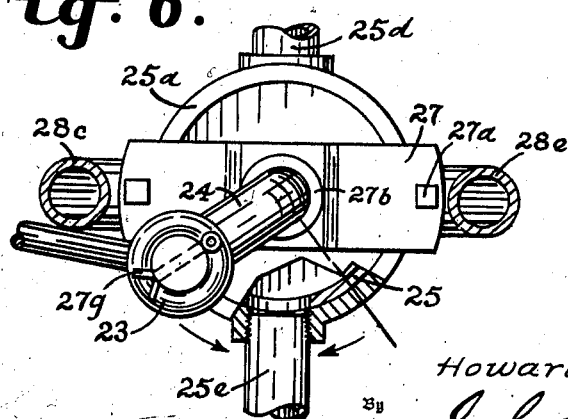

In the appended drawings, Fig. 1 is a vertical longitudinal axial section, with the entrained plurality of coacting elements, of my invention, which includes a rotary driving shaft, a fixed closed cylinder traversed centrally and longitudinally by the shaft, manually controllable adjusting means movably mounted on the shaft, a rockable ported adjustable distributor mounted in the cylinder, coacting pairs of pistons within the cylinder as differently operable, gearings driven by the shaft, and tubular connections between said distributor and the distributing plurality of shaft-connected valved cylinder pistons. Fig. 2 is a cross section of the closed cylinder or casing, showing inner cross braces, and an elevation of the coacting gears with their offset crank devices and the meshing medial gear. Fig. 3 is a detail elevation of a pair of cylinders as connected, with intermediate crank device of the side gears. Figs. 4 and 4a are details of the crank connections, in which 4a is a detail. Fig. 5 is an axial enlarged detail view of the apertured fixed outer valve chamber and the rockable valve therewithin having apertures adapted to be in adjustable communication with the apertures of the outer chamber at times, and means for rocking the valve, and showing the respective receiving and delivery conduits therefor. Fig. 6 is a detail view of the upper end parts of the outer valve chamber, with its offset rockable valve stem and connection, parts of the conduits being broken away, on the same scale as that of said Fig. 5.

The fixed shaft part 9 is fixed to the part 10c, and has its outer part without the cylinder and traversing a central seat in the right-hand bearing end wall boss of the right-hand discoidal wall of the cylindrical closed chamber and is secured rigidly thereto by a headed bolt 4b, threaded, traversing the inner part of a boss thereon and also traversing the shaft part 9, and secured by means of a nut 4c. The outer extremity of the shaft section 9 traverses and is fixed in a sleeve 2b seated through a fitting aperture in the post 1a which latter extends upwardly at 2a. A ring 2d is locked on the outer protruding end of the shaft part 9 and secured by a set-screw 2e.

The numeral 3 in Fig. 1 denotes the circumferential chamber wall whose right-hand end is directed outwardly angularly and secured to the outer edge part of the right-hand end wall of the chamber by traversing threaded bolts 5a and nuts 6a, with an impermeable flat ring 7a interposed. The chamber wall 3 has longitudinally arranged and spaced sets of outwardly directed threaded nipples as at 3d carrying inwardly threaded caps, as at 8, 8a and 8b. The opposite end part of the chamber 3 also has a circular outwardly directed flange 3b, secured to the rim part of the end wall 4, and secured thereto by bolts 5 and nuts 6, with an impermeable flat interposed ring between at 7.

A tubular sleeve 10e partially covers the joint of the fixed shaft part 10c and the abutting end part of the rotatable main shaft 2. The sleeve 10a 10c, together with the shaft 9 are traversed by a threaded bolt 11b and secured thereon by a nut 11a. The cylindrical part 10a has upwardly and downwardly directed rigid arms as at 10b, respectively integrally carrying similar cylinders at 10, and 11, closed at their outer ends by sealing rings 4a, with their opposed inner ends open and longitudinally opposite to each other. The left-hand upper cylinder 12 contains a fitting piston 16 with closed outer end, and has a plurality of spaced split-rings 20 therearound. Each piston head has an integral central inwardly threaded hollow boss 19f, and each piston likewise has an inwardly projecting shaft part as at 14 above in the cylinder part, and at 13 below, and the adjacent inner ends of the shaft parts have like flanged ends as at 47 and 46. Each piston, as at 19a, has an inwardly longitudinally directed boss with inward ends centrally apertured at 19c in an end wall, and the outer end part of each aperture wall is chamfered to seat therewithin a resilient split-ring 19e, with a conic compression spring 19d end-engaged with and between the split-ring and inner apertured end wall normally closed thereby and the closure member 19d. The pairs of upper piston rods 14 and 14a being connected at 47 and the lower pair at 46, the pairs of pistons above and below are set off longitudinally relative to each other as shown in Fig. 1, with relative opposite to and fro movements. In the lower part of the chamber 3 are like inwardly opening cylinders on the shaft parts 13 and 13a. The lower pistons are like the upper pistons 15 and 16.

The chamber 3 has a left-hand head 4, and the head 4 has similar securing means at 5, 6 and 7 like the securing means for the right-hand head and parts 5a, 6a and 7a.

In the lower left-hand part of the chamber 3 and in the lower right-hand part thereof are like inwardly opening cylinders 11. These cylinders contain like pistons respectively, which have like shaft parts 13a with their inner ends likewise connected by sleeves. Eccentrically mounted pins 39 and 39a are mounted on the outer faces of the upwardly spaced pair of bevel gears 37 and 38, which have stub-shafts 35 and 36 in spaced alinement vertically and seated in a medial vertical offset boxing 32—33 diminished at their outer ends, the stub-shafts having their inner ends traversed by pins 34d having a set-screw 34. The medial part 33 have diminished end parts 32, and are medially apertured to seat upon a sleeve fixed on the shaft 2. A bevel-gear wheel 43 is fixed on the rotary shaft 2 adjacent the apertured projection 10a. In Fig. 2 is shown the left-hand face of the bevel-gear 43 which is in mesh with the opposite pair of like gear-wheels 37 and 38. A pair of horizontal transverse and vertically spaced brace-bars 40 and 40a have upset ends fastened to the inner wall of the chamber 3 and are spaced equally above and below the shaft 2. The member 27 (see Fig. 5) is mounted by bolts 27a upon the outer casing 25a.

The outer casing 25a is diminished downwardly conically with a lower open end, and an inner chamber 25, similarly coned and having closed upper and lower ends is rockably seated in the outer casing 25a, and the chamber 25 has an axial stem 24 upwardly directed, then bent to the left and then upwardly. The member 27 is medially apertured with an inner thread in which is fitted an outwardly threaded sleeve 27b with the lower part of the stem 24 rockably traversing the sleeve. As shown in Figs. 1 and 6, an arm 23a has a terminal ring loosely mounted around the upper part of the stem 24 and retained there by a split key. The arm 23a has a clevis joint 22 connecting it with a relatively rigid longitudinal rod 4u extending to the left and screwed into a side part of a channeled slide 49 slidably mounted on the tubular axial projection 4f integral with the left-hand head 4 of casing 3. The projection 4f has an inner liner 4j seating therewithin said driving shaft 2. The outer end of the tubular projection 4f extends through the bearing 4j of the post 1, and is exteriorly threaded to seat thereon an interiorly threaded cap-sleeve 2c. A ring is mounted on the tubular projection 4f and held against the post 1 by a screw 4i. Above the projection 4f an arm 1b is fastened on the post 1 and extends toward the chamber head 4, and on the arm is pivoted at 1c a bar 4k with an operating rod 1d pivoted to its upper end. A pull-rod 1d is end-pivoted to the upper end of the bar 4k, to be used by an operator. The lower part 4k of the bar has a forked end 4l loosely embracing the member 49 for shifting the latter to and fro on the projection 4f. There are vertically spaced exterior perforated nipples on the left hand head 4 spaced equally from the projection 4f and carrying outer threads respectively on which are mounted interiorly threaded cap nuts 4d seated on bearing sleeves 4p traversed by reciprocatory rods 4p and 4u, which are positioned above and below the shaft 2 in spaced relation. A strut 4r is fixedly connected at its upper and lower ends to and between the cylinders 12 and 11 and secured thereto by screws 4t. This strut is slideably traversed by the rods 4p and 4u. The left-hand upper rod 4u has its outer end connected to the right-hand flange of the slide body 49. The rod 4p slideably traverses a sleeve 4m and the rod has its right-hand end part squared to move through a squared hither seat in the strut 4r. At the hither side of the shaft 2 a rock-body 4y is medially pivoted to the strut 21 at 4z. Said rock-body has a plurality of teeth at both ends which mesh with like teeth on the rods 4u and 4p. The rod 4p is an idler, and the rock-body 4y is maintained in place to keep the teeth on the upper rod 4u in engagement with the upper teeth on the rock-body. By the above means the rock-shaft 24 of the inner coned body 25 may be rocked variably to more or less open or close the side ports of the fixed outer coned body 25a, thus more or less controlling the oil content as desired. As shown in Figs. 1, 5 and 6, the rock-body 25 is closed at both ends, with two tiers or pluralities of wall apertures as shown in Fig. 5, the four upper and the four lower apertures being vertically spaced from each other, and in similar arrangement the apertures such as 25b and 25d in the fixed outer housing 25a are positioned in line circumferentially around the housing 25a, whereby the hand lever 4k may be rocked by the operator to slide the flanged sleeve 49 on the member 4f, causing the rod 4u to be shifted to and fro together with the hinged arm 23a at the joint 22 to rock at 23 the crank end of the shaft 24 (see Fig. 5) together with the inner hollow cone 25 a desired distance in thus opening communications with each other of the circumferentially alined openings 25b with the pipes 28c and 28e, and at the same time also opening communications between the openings 25c with the lower pipes 28 and 30 respectively. The oil content then is moved by alternate to and fro movements of the pistons under pressure through the respective pipes in turn and by the piston-rods such as 14 and 13a, and by the rotation of the shaft 2 with the medial gear-wheel 43, the pair of side gears 37 and 38 and the offset pins 39 and 39a in the shaft bearings 47 and 46 respectively, thus actuating the piston-heads in said cylinders at opposite sides of the chamber 3 in opposite directions.

As shown in Fig. 1 the upper left-hand piston 19f is at the left-hand limit of its stroke to the left, the opening 19a being closed by the coiled spring 19d, which is retained in place by the resilient split-ring 19e, being a part of it. In the return reactive movement of the spring, the closure plate 19b is relieved from the pressure of the spring to open the aperture 19c to allow oil to pass through the apertured boss 19a to the left-hand of the piston-head and releasing the pressure between the heads 16 and 15.

The rock-body 4y has at opposite ends a plurality of teeth to mesh with the down-turned teeth on the shifting-rod 4u, whereby the adjustment of said rod is held after adjustment, and also supported by the meshing of the opposite lower teeth of the rock-body 4y with the teeth on the medial offset part of the lower rod 4p, the upper rod 4u having also a medial offset part, and whereby the rock-body 4y is in parallel at one side of the main power shaft 2.

By the shifting either way of the valve 25, by means of the lever 4k, the valve device is opened or closed adjustably, thus varying the scope of the braking operation of the mechanism on the main shaft and connections.

I claim:

In combination, a closed housing having an end bearing and a top nipple with a closure therefor, a rotary shaft traversing the end bearing with a bevel gear mounted on the shaft within the housing, a relatively reversed pair of bevel gears rotatably supported within the housing and in mesh with said first bevel gear, longitudinally separated pairs of cylinders closed at their outer ends against the upposite housing heads with their inner ends open, pairs of valved pistons mounted in the cylinders, piston rods projecting from the pistons toward each other with their inner ends connected by transversely apertured bearings, the pistons in the upper and lower sets of cylinders being offset relatively to each other, and for opposite reciprocations, said reversed bevel gears having offset pintles thereon relatively opposite to each other and seated loosely in said apertured bearings, a closed hollow truncated conical member mounted within the housing and having in its side wall vertically spaced pairs of openings, a relatively fixed hollow truncated conical member seating the first conical member therewithin and having in its side wall vertically spaced pairs of openings with which the openings in the inner conical member may be variably alined when the latter member is rocked to and fro, tubular conduits leading from opposite sides of the fixed conical member and its lateral openings to communicate with the outer end parts of said cylinders beyond the pistons, adjusting means mounted without an end wall of the housing, manually operable, and including a rod movably reciprocable through an open seat in said end wall, said inner conical member having an end crank, a joint connection between said rod and said crank, manually rockable devices without the housing connected to the rod, and a suitable oil filling the interior of the housing about its contained mechanisms.

HOWARD A. KIRK.